(12) United States Patent
Langrell

(10) Patent No.: US 12,075,749 B2
(45) Date of Patent: Sep. 3, 2024

(54) MODULAR LIVESTOCK ALLEY CONSTRUCTION AND STRATEGIC CLADDING OF LIVESTOCK HANDLING EQUIPMENT TO OPTIMIZE LIVESTOCK FLOW THERETHROUGH

(71) Applicant: Northquip Inc., Woodlands (CA)

(72) Inventor: Stephen Arthur Langrell, Woodlands (CA)

(73) Assignee: Northquip Inc., Woodlands (CA)

( * ) Notice: Subject to any disclaimer, the term of this patent is extended or adjusted under 35 U.S.C. 154(b) by 174 days.

(21) Appl. No.: 17/627,773

(22) PCT Filed: Jul. 30, 2019

(86) PCT No.: PCT/CA2019/051038
§ 371 (c)(1),
(2) Date: Jan. 17, 2022

(87) PCT Pub. No.: WO2021/016698
PCT Pub. Date: Feb. 4, 2021

(65) Prior Publication Data
US 2022/0312720 A1    Oct. 6, 2022

(51) Int. Cl.
*A01K 1/00*      (2006.01)
*A01K 15/04*    (2006.01)

(52) U.S. Cl.
CPC ............ *A01K 1/0023* (2013.01); *A01K 15/04* (2013.01)

(58) Field of Classification Search
CPC ...... A01K 1/0023; A01K 1/0613; A01K 1/00; A01K 1/0017; A01K 1/0029; A01K 15/04
USPC ........................................ 119/843; 256/73, 24
See application file for complete search history.

(56) References Cited

U.S. PATENT DOCUMENTS

| 733,874 | A | * | 7/1903 | Reck et al. | ........... | A01K 1/0613 |
| | | | | | | 119/733 |
| 2,522,170 | A | * | 9/1950 | Fuller | ................... | A01K 1/0613 |
| | | | | | | 119/752 |
| 2,576,654 | A | * | 11/1951 | Thorson | ............... | A01K 1/0613 |
| | | | | | | 119/733 |

(Continued)

FOREIGN PATENT DOCUMENTS

| AU | 2016101820 | 11/2016 |
| NZ | 545349 | 5/2006 |

(Continued)

*Primary Examiner* — Timothy D Collins
*Assistant Examiner* — Maria E Graber
(74) *Attorney, Agent, or Firm* — Kyle R Satterthwaite; Ryan W Dupuis; Ade & Company Inc.

(57) ABSTRACT

Livestock handling equipment characterized by a modular alley construction employing shared bows with hole-penetrated front and rear faces for fastening of elongated structural beams and coupling of side panels at both of said faces. Longitudinally protruding coupling members on said side panels for engaging said holes include grooved and longitudinally extendable/retractable pivot pins at the bottom ends of the side panels. Selectively mountable/removable cladding members enable convenient strategic customization of cladding coverage to optimize livestock flow via pressure zone techniques, physical intervention and/or light-based attraction, and also enable physical access for inspection and treatment of the animals.

12 Claims, 8 Drawing Sheets

(56) References Cited

U.S. PATENT DOCUMENTS

| | | | | | |
|---|---|---|---|---|---|
| 2,593,559 | A | * | 4/1952 | Heldenbrand | A01K 1/0613 119/736 |
| 2,660,982 | A | * | 12/1953 | Linton | A61D 3/00 119/752 |
| 2,804,046 | A | * | 8/1957 | Turner | A01K 1/0613 119/736 |
| 2,904,005 | A | * | 9/1959 | Mielke | A01K 15/04 119/751 |
| 2,935,966 | A | * | 5/1960 | Smith | A01K 1/0613 119/734 |
| 2,999,480 | A | * | 9/1961 | Sparkman | A01K 1/0613 119/737 |
| 3,099,249 | A | * | 7/1963 | Newhouse, Jr. | A01K 1/0613 119/734 |
| 3,511,216 | A | * | 5/1970 | George | A61D 3/00 119/750 |
| 3,960,113 | A | * | 6/1976 | Kratky | A01K 1/0613 119/723 |
| 4,124,198 | A | * | 11/1978 | Wong | E04H 17/1602 256/73 |
| 4,470,372 | A | * | 9/1984 | Norman | A61D 3/00 119/524 |
| 5,129,362 | A | * | 7/1992 | Ferrell | A61D 3/00 119/843 |
| 5,184,572 | A | * | 2/1993 | Meier | A01K 15/00 119/733 |
| 5,331,923 | A | * | 7/1994 | Mollhagen | A61D 3/00 119/734 |
| 5,626,100 | A | * | 5/1997 | Stubbs | A61D 3/00 119/734 |
| 5,669,332 | A | * | 9/1997 | Riley | A01K 1/0613 119/751 |
| 6,021,742 | A | * | 2/2000 | Cummings | A01K 1/0613 119/843 |
| 6,039,002 | A | * | 3/2000 | Strankman | A01K 1/105 119/60 |
| 6,425,351 | B1 | * | 7/2002 | Mollhagen | A01K 1/0613 119/733 |
| 6,470,831 | B1 | * | 10/2002 | Taylor | A01K 1/0613 119/751 |
| 6,502,531 | B1 | * | 1/2003 | Pound | A61D 3/00 119/757 |
| 6,513,459 | B2 | * | 2/2003 | Linn | A01K 1/0613 119/729 |
| 6,609,480 | B2 | * | 8/2003 | Daniels | A01K 1/0613 119/752 |
| 8,910,595 | B2 | * | 12/2014 | Ulrich | A01K 1/0613 119/732 |
| 10,039,262 | B2 | * | 8/2018 | Firth | A01K 1/062 |
| 10,779,506 | B1 | * | 9/2020 | Ulrich | A01K 1/0613 |
| 11,622,533 | B2 | * | 4/2023 | Bakko | A01K 1/0613 119/729 |
| 2004/0168652 | A1 | * | 9/2004 | Priefert | A61D 3/00 119/733 |
| 2005/0132978 | A1 | * | 6/2005 | Bentz | A01K 1/0613 119/732 |
| 2006/0191492 | A1 | * | 8/2006 | Ross | A01K 1/0613 119/734 |
| 2013/0326959 | A1 | * | 12/2013 | Gipson | A01K 1/0613 49/357 |
| 2016/0192618 | A1 | * | 7/2016 | Punt | A01K 1/0613 119/729 |

FOREIGN PATENT DOCUMENTS

| | | | |
|---|---|---|---|
| WO | WO-8502994 A1 | * | 7/1985 |
| WO | 2006026643 | | 3/2006 |

* cited by examiner

MODULAR LIVESTOCK ALLEY CONSTRUCTION AND STRATEGIC CLADDING OF LIVESTOCK HANDLING EQUIPMENT TO OPTIMIZE LIVESTOCK FLOW THERETHROUGH

FIELD OF THE INVENTION

The present invention relates generally to livestock handling equipment, and more particularly to the construction of livestock alleys and to techniques for adapting alleys and other livestock handling equipment to encourage animal movement therethrough.

BACKGROUND

In the field of livestock handling, and particularly cattle handling, it is well known practice to erect a narrow alleyway to constrain movement of the livestock to linear single-file travel from on area to another, for example from a crowding tub, where a group of livestock are introduced, to a squeeze chute, where individual inspection and/or treatment of a singular animal is carried out.

As the length of alley needed for various applications can vary, they are typically constructed in sections, of which each section features a pair of upright side panels situated in opposing parallel relation to one another to define the two opposing sides of the alley section, and a pair of bows between which the two panels are suspended. Each bow features a lower base seated atop the ground, a pair of uprights standing upward from the lower base at or near the ends thereof to define opposing lateral sides of the bow, and a header spanning between and interconnecting the uprights at the top end of the bow. The base, header and uprights thus collectively delimit an opening, which serves as an entry or exit point to or from the respective section of the alley, through which the animal travels in a predetermined direction from one bow to the other in a confined fashion between the side panels. The confined space delimited between the side panels prohibits the animal from turning around and travelling in the reverse direction. Often the alleys are width adjustable, in that one or both of the side panels is adjustable in position relative to the bows to enable movement of one or both panels toward and away from one another to adjust the spacing therebetween to best suit the size of animal being handled.

In Applicant's prior Easy Flow alley product, each section was assembled from a dedicated pair of bows respectively defining the longitudinally opposing ends of the individual section, a pair of panels suspended between said bows in a manner pivotable about their lower ends to enable pivoting of the two side panels toward or away from one another to adjust the alley width, and a central overhead beam connected between the bow headers to impart structural integrity. If the customer required a finished alley length exceeding that of a single section, they would order multiple sections, and then couple adjacent sections together using a pinned connection between the exit bow of one section and the entrance bow of the next section. For such purposes, the bows of each section featured horizontal lugs projecting longitudinally from the bow at an outer face thereof, with pin-accepting holes opening vertically through the lugs for vertical pinning together of the adjacent sections at the bow lugs thereof. However, one shortcoming of such design is the creation of a potential foot trap by the gap space between the pinned-together bows of the adjacently coupled sections. As an alternative to customer pinning together of separate sections, a custom-length alley of welded together sections could be employed to avoid the foot-traps of pinned-together sections. However, such option provides less flexibility should the customer later need to switch to a shorter alley layout, thus requiring that they replace the welded-together long alley with an entirely new and shorter alley. Additionally, the number of sections that could be pre-welded together is limited by transport constraints limiting the length of alley that can be shipped to the customer.

Another prior alley product, the Homesteader Deluxe from Powder River Manufacturing, uses a shared bow between an adjacent pair of section sections. The assembled alley relies on the same horizontal lug and vertical pin connection described above, but for the purpose of connecting the four side panels of the adjacent sections to the shared bow, rather than connecting together dedicated entrance and exit bows of two adjacent alley sections. Alley width adjustment is made by lateral displacement of the side panels on one side of the alley. The bows of the finished alley are interconnected only by these vertically pinned side panels, with no additional componentry to impart further structural integrity. Additionally, the vertically pinned connections only allow for adjustment of the alley width by the one-sided lateral panel displacement, and are not compatible with the pivotal adjustment type employed in Applicant's aforementioned Easy Flow alley.

In addition, livestock alleys are conventionally cladded at the side panels thereof. Some alleys are cladded to a relatively high elevation, limiting the peripheral vision of the livestock travelling through the alley to keep them moving forward without distraction, but with the detrimental effect of making it difficult for a handler to intervene when the flow of livestock is interrupted by a straggler, as the handler must reach up and over the tall cladding to encourage the animal forward. Previously, one solution has been the addition of an external catwalk outside the alley from which the handler can work from an elevated location. Other alleys employ shorter cladding allowing easier interaction between the handler and the livestock, but increasing the peripheral sightlines of the livestock, thereby increasing the potential for livestock distraction and resulting flow interruption.

Accordingly, there remains room for improvement to livestock alleys and similar livestock handling equipment, particularly in ways that address the forgoing shortcomings of the prior art.

SUMMARY OF THE INVENTION

According to a first aspect of the invention, there is provided a modular livestock alley system comprising:

a plurality of bows each comprising a lower base, and upper header, and a pair of uprights spanning between the lower base and header at opposite lateral sides of the bow, whereby the base, header and uprights cooperatively delimit an opening through which an animal can traverse;

a plurality of side panels each having two longitudinally opposing ends at which the side panel is configured for connection to any one of said bows at a front or rear side thereof; and a plurality of elongated upper beams each having two ends at which the elongated upper beam is configured for connection to the front or rear side of any one of said bows at or near an upper end thereof;

whereby connection of a pair of said panels and one of said elongated upper beams between a pair of said bows cooperatively forms an alley section that is terminated at opposing ends thereof by said pair of bows, through which an animal can enter and exit said alley section during travel therethrough between the pair of side panels; and wherein each bow is configured for optional connection of a respective pair of said side panels and a respective one of the overhead beams at both the front and rear sides of said bow to enable sharing of a singular bow between two adjacent alley sections.

According to a second aspect of the invention, there is provided a modular livestock alley system comprising:

a plurality of bows each comprising a lower base, and upper header, and a pair of uprights spanning between the lower base and header at opposite lateral sides of the bow, whereby the base, header and uprights cooperatively delimit an opening through which an animal can traverse;

a plurality of side panels each having two longitudinally opposing ends at which the side panel is configured for connection to any one of said bows; and whereby connection of a pair of said panels between a pair of said bows cooperatively forms an alley section that is terminated at opposing ends thereof by said pair of bows, through which an animal can enter and exit said alley section during travel therethrough between the pair of side panels; and wherein each bow, at both front and rear faces thereof that face outwardly from the opening of the bow in opposite directions at the front and rear sides thereof, is configured for optional connection of a respective pair of said side panels to enable sharing of a singular bow between two adjacent alley sections.

According to a third aspect of the invention, there is provided a livestock alley system comprising:

a plurality of bows each comprising a lower base, and upper header, and a pair of uprights spanning between the lower base and header at opposite lateral sides of the bow, whereby the base, header and uprights cooperatively delimit an opening through which an animal can traverse;

a plurality of side panels each having two longitudinally opposing ends at which the side panel is configured for connection to any one of said bows, whereby connection of a pair of said panels between a pair of said bows cooperatively forms an alley section that is terminated at opposing ends thereof by said pair of bows, through which an animal can enter and exit said alley section during travel therethrough between the pair of side panels;

wherein each side panel comprises a circumferentially grooved pivot pin projecting longitudinally therefrom at each end thereof for engagement with said one of the bows.

According to a fourth aspect of the invention, there is provided a livestock alley system comprising:

a plurality of bows each comprising a lower base, and upper header, and a pair of uprights spanning between the lower base and header at opposite lateral sides of the bow, whereby the base, header and uprights cooperatively delimit an opening through which an animal can traverse;

a plurality of side panels each having two longitudinally opposing ends at which the side panel is configured for connection to any one of said bows, whereby a pair of said panels are connectable between a pair of said bows during construction of an alley section that is terminated at opposing ends thereof by said pair of bows, through which an animal can enter and exit said alley section during travel therethrough between the pair of side panels;

wherein each side panel comprises at least one extendable/retractable pivot pin at a respective one of the longitudinally opposing ends of said side panel at or adjacent a lower end of said panel, said pivot pin being longitudinally extendable/retractable to adjust a distance by which said pivot pin projects longitudinally from said end of the side panel.

According to a fifth aspect of the invention, there is provided a side panel for a livestock alley, said panel having longitudinally spaced apart ends, at each of which said panel comprises a circumferentially grooved pivot pin projecting longitudinally therefrom.

According to a sixth aspect of the invention, there is provided a side panel for a livestock alley, said panel having longitudinally spaced apart ends, at one or both of which said panel comprises an extendable/retractable pivot pin that is situated at or adjacent a lower end of said panel and is longitudinally extendable/retractable to adjust a distance by which said extendable/retractable pivot pin projects longitudinally from said end of the side panel.

According to a seventh aspect of the invention, there is provided customizable livestock handling equipment comprising:

panels forming, or usable to form, an enclosure or pathway for containing or guiding livestock, each panel comprising a skeletal framework defining an overall shape and size of said panel, and delimiting one or more open spaces between frame members of said skeletal framework; and attachable/detachable cladding members each comprising a sheet of opaque material of similar size and shape to one or more of said open spaces of said panels, and each cladding member having a predefined set of mounting features by which the cladding member is selectively mountable and removable to and from one of said panels at a selected one of said one or more open spaces thereof, said mounting features residing at predetermined positions for alignment over a group of said frame members when cladding member is placed over any of said one or more open spaces of said panels;

whereby an installer or user of said livestock handling equipment can employ selective placement of said prefabricated cladding members on the skeletal frames of the panels according to requirements of a particular installation or livestock handling task.

According to an eighth aspect of the invention, there is provided a method of configuring livestock handling equipment for optimal handling of livestock movement therein, said method comprising:

(a) from among existing or intended boundaries areas of the livestock handling equipment that delimit an internal space or pathway to or through which the livestock is to be confined or guided, and that are, or will be, defined by panels having a skeletal frame structure to which cladding may be applied to obstruct open spaces between frame members of said skeletal frame structure, identifying and distinguishing between:

(i) strategic boundary locations toward which attraction of the livestock, or through which interaction between the livestock and a handler, would be beneficial to the flow of livestock into, through or from said internal space or pathway; and (ii) other boundary locations distinct from said strategic boundary locations identified in step (a)(i); and (b) selectively applying cladding to the boundary areas of the livestock handling equipment, during which the other boundary locations identified in step (a)(ii) are cladded to a greater degree than the said strategic boundary locations identified in step (a)(i).

According to a ninth aspect of the invention, there is provided a livestock alley system comprising:

a plurality of bows each comprising a lower base, and upper header, and a pair of uprights spanning between the lower base and header at opposite sides of the bow, whereby the base, header and uprights cooperatively delimit an opening through which an animal can traverse;

a plurality of side panels each having two longitudinally opposing ends at each of which the side panel is configured for connection to one of said bows, whereby a pair of said panels are connectable between a pair of said bows during construction of an alley section that is terminated at both ends by said pair of bows, through which an animal can enter and exit said alley section during travel therethrough between the pair of side panels;

wherein each side panel comprises:
  a pair of extendable/retractable lock pins respectively disposed at the longitudinally opposing ends of said side panel, and each movable between an extended position engaged with a respective one of the bows and a retracted position disengaged therefrom; and
  a shared actuation device operable to move both of said lock pins into the retracted position.

According to a tenth aspect of the invention, there is provided a side panel for a livestock alley, said panel having longitudinally spaced apart ends, a respective lock pin installed at each of said longitudinally spaced apart ends and movable between a deployed position reaching longitudinally from the respective end of the side panel for engagement with a respective bow of the livestock alley, and a retracted position of lesser longitudinal reach from the respective end of the side panel for disengagement from said respective bow, and a shared actuation device operable to move both of said lock pins into the retracted position

BRIEF DESCRIPTION OF THE DRAWINGS

Preferred embodiments of the invention will now be described in conjunction with the accompanying drawings in which.

DETAILED DESCRIPTION

Figure 1:
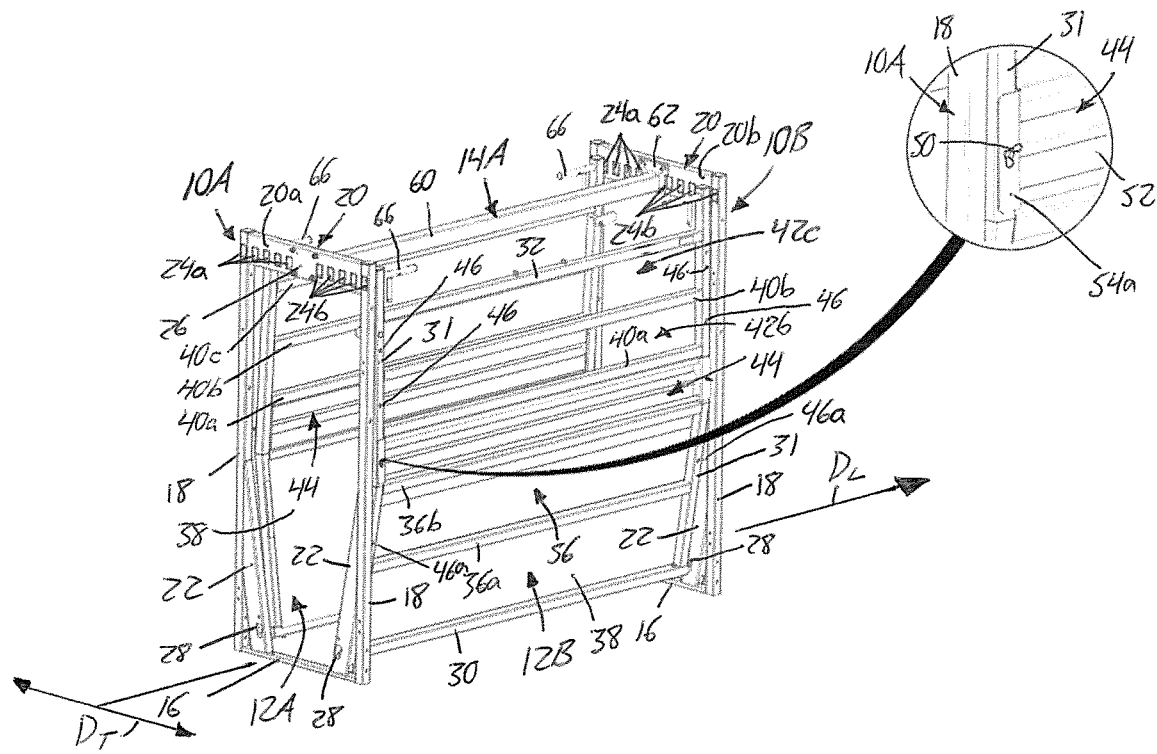
FIG. 1 is a perspective view of a single-section livestock alley assembled from a modular system of the present invention whose side panels have selectively mountable/removable blinders enabling a user to customize the degree of cladding on either side of the alley.
Figure 2:
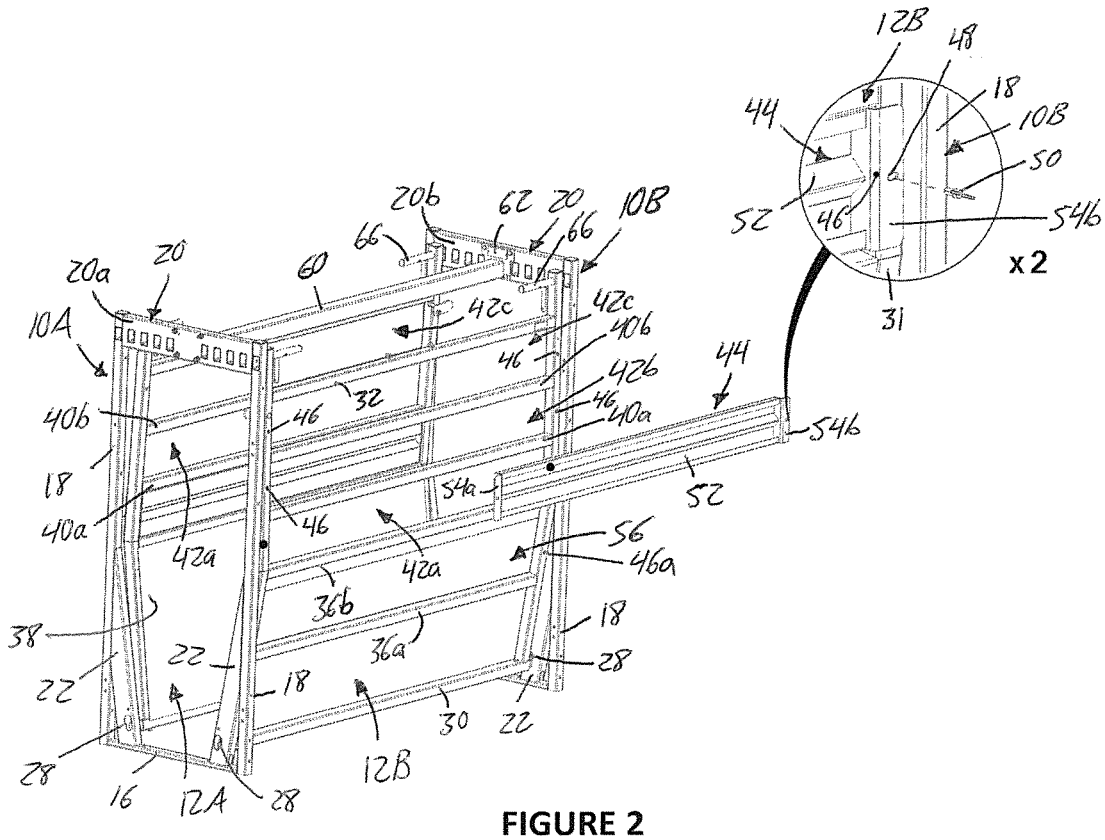
FIG. 2 is another perspective view of the single-section livestock alley of FIG. 1, illustrating removal of one of the mountable/removable blinders from one of the alley's side panels.
Figure 3:
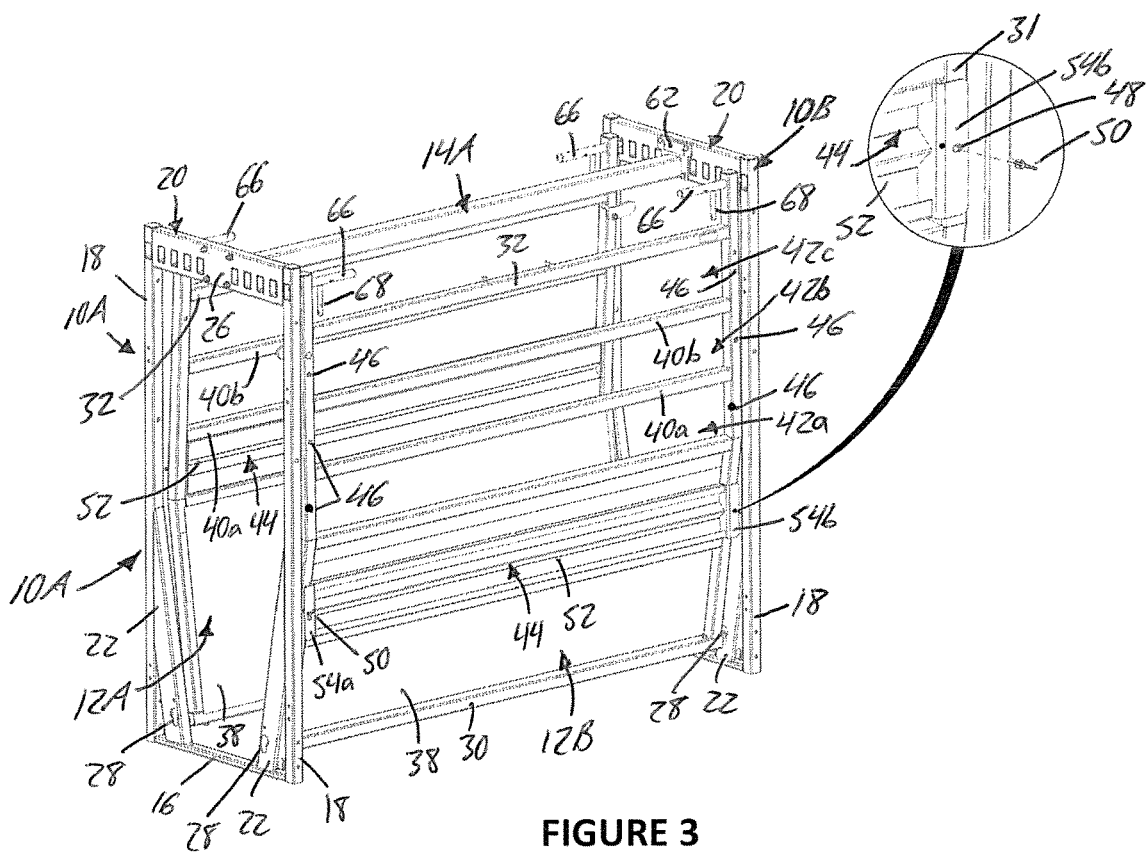
FIG. 3 is another perspective view of the single-section livestock alley of FIG. 2, showing relocation of the removed blinder to a storage location situated behind a permanent lower cladding sheet of the side panel.
Figure 3A:
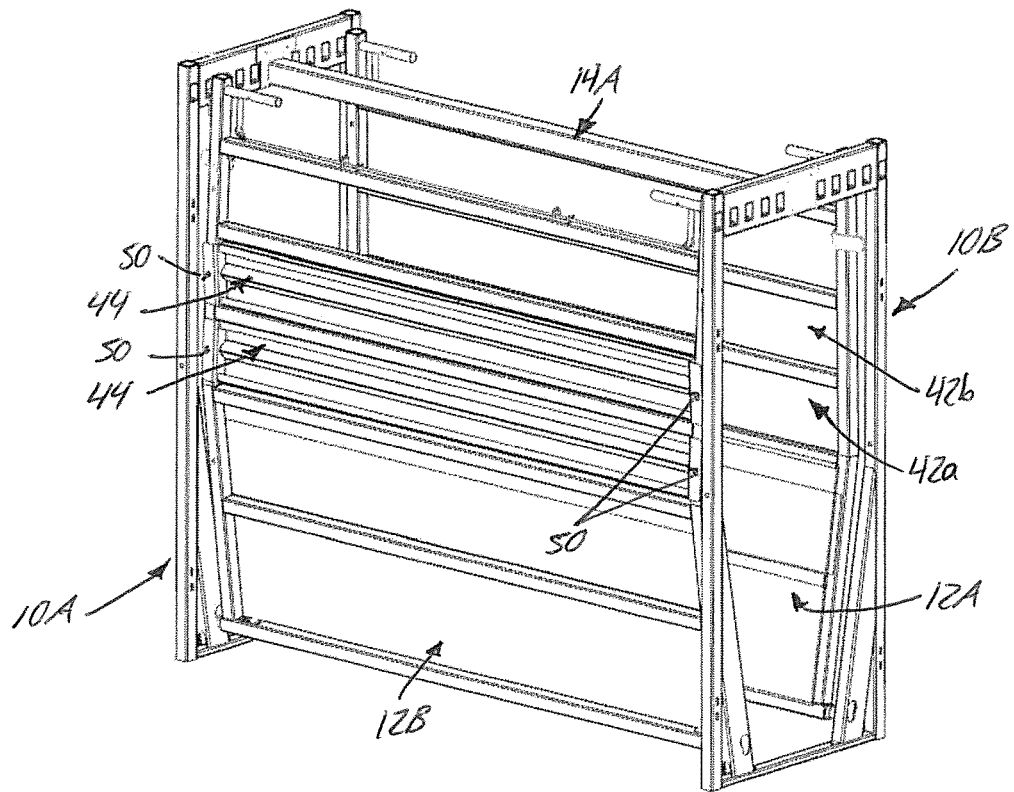
FIG. 3A is another perspective view of the single-section livestock alley of FIG. 3, showing relocation of the removed blinder to a working position on the opposing side of the alley to maximize.
Figure 4:
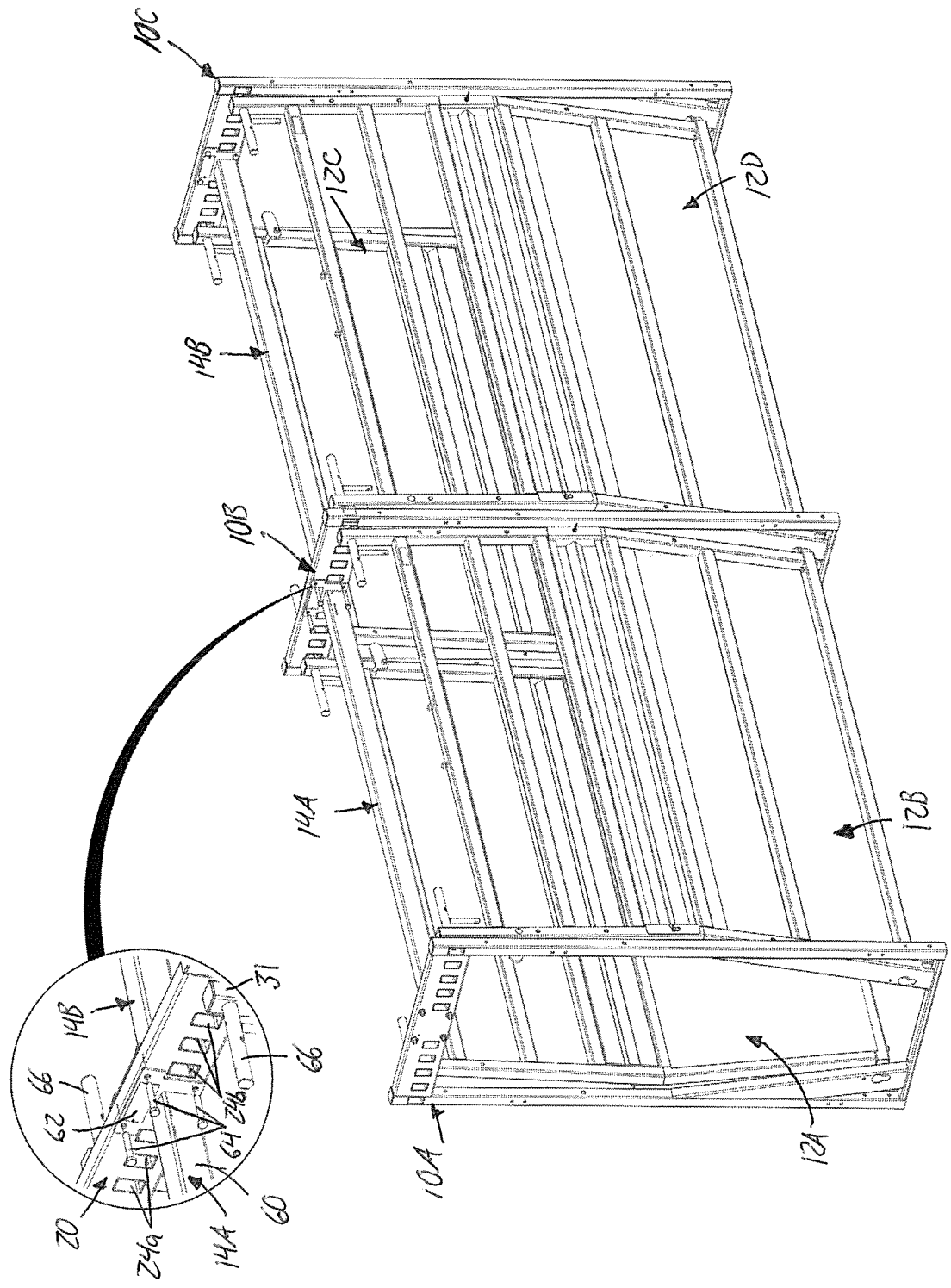
FIG. 4 is a perspective view of a multi-section livestock alley constructed from the same modular system as the single-section alley of FIG. 1, and illustrating use of shared bow between adjacent sections of the finished alley.

FIGS. 1 through 3 illustrate a single-section livestock alley assembled from a modular system of the present invention that enables shared use of a singular bow between adjacent sections, as further illustrated in FIG. 4. The modular system employs a plurality of identical bows 10A, 10B, 10C; a plurality of identical side panels 12A, 12B, 12C, 12D; and a plurality of identical elongated beams 14A, 14B. FIGS. 1 through 3 illustrate a single livestock alley section consisting of two bows 10A, 10B; two side panels 12A, 12B and one elongated beam 14A.

Each bow features a lower horizontal base 16 seated atop the ground and lying in a horizontal transverse direction $D_T$ that is perpendicularly to horizontal longitudinal direction $D_L$ through which livestock traverse through the alley. At or near each end of the horizontal base 16, a respective vertical upright 18 stands perpendicularly upward from the horizontal base to define a respective lateral side of the bow. At or near the top ends of the vertical uprights 18, a header 20 spans horizontally between the uprights 18 in parallel and opposing relation to the lower base 16 at elevated an aligned position thereover. The base 16, uprights 18 and header 20 thus collectively delimit a rectangular opening through which an individual livestock animal can enter or exit the alley section for travel therethrough in the longitudinal direction.

In the illustrated embodiment, each bow additionally features a pair of angled side members 22, each of which spans at a steep angle between the lower base 16 and a respective one of the uprights 18 on an inner side of the upright that faces toward the opposing upright at the opposing lateral side of the bow. The upward reach of each angled side member 22 terminates at an intermediate point between the base 16 and the header 20, whereby a lower portion of the overall rectangular opening of the bow is effectively limited to a narrower area of inverted trapezoidal shape compared to the wider rectangular remainder of the opening above the angled side members 22. The two side members 22, like the rest of the bow, are symmetric across a vertical reference plane that bisects the openings of the alley section's two bows in the longitudinal direction.

The uprights 18 and the angled side members 22 are formed of rectangular metal tubing of equal thickness to one another in the longitudinal direction, and placed in alignment with one another so that that at opposing front and rear sides of the bow, the flat outer surfaces of these rectangular tubing members that face oppositely of one another in the longitudinal direction are generally flush or coplanar with one another. The header 20 features a tubular or box construction of likewise equal thickness in the longitudinal direction, and is likewise aligned with the uprights in this direction so that flat outer surfaces 20a, 20b of the header 20 that face oppositely of one another in the longitudinal direction reside in flush and coplanar relation to those of the uprights 18 and angled side members 22 at the front and rear sides of the bow.

The flush surfaces of header, uprights and side members on each of the front and rear sides of the bow collectively denote a respective front or rear face thereof. Near the top of the bow, each face thereof features two sets of upper panel-support openings 24a, 24b therein. The two sets are symmetric to one another across the vertical reference plane, and each feature a series of openings spaced apart from one another in the transverse direction $D_T$. In the illustrated example, each set features a plurality of openings in the outer surface of the header 20, and one in the outer surface of a respective one of the uprights 18. The two sets of upper panel-support openings 24a, 24b penetrating each face of the bow align with those at the other opposing face thereof. A central area 26 of each outer surface of the header between the two sets 24a, 24b of upper panel-support openings remains intact, i.e. unpenetrated by the panel-support openings. This intact central area 26 defines a mounting surface for receiving a respective end of the longitudinal beam 14A.

In addition to the upper panel-support openings 24a, 24b, each face of each bow is penetrated by two lower panel-support openings 28, which in the illustrated example reside in the respective outer surfaces of the two angled side members 22. Each of the lower panel-support openings 28 has a non-uniform width, and more particularly a wider upper portion of greater width than a narrower lower portion. The illustrated example employs keyhole-shaped lower panel-support openings, each having a circular upper portion whose diameter exceeds the width of a lower stem reaching downward therefrom. As described in more detail below, the upper and lower panel-support openings 24a, 24b, 28 are used to support the ends of the alley's side panels via longitudinally protruding coupling features thereon.

Having described the structure shared by the identical bows of the modular system, attention is now turned to the identical side panels thereof. Each side panel, labeled generically as 12 when shown in isolation in FIG. 5, features a rigid skeletal frame, for example formed of welded-together lengths of rectangular metal tubing. In the illustrated example, the frame members that comprise this skeletal frame including a lower longitudinal member 30 lying horizontally in the longitudinal direction $D_L$ and denoting a bottom end of the side panel, a pair of upright end members 31 standing upright from the bottom member 30 at longitudinally opposing ends thereof, an upper longitudinal member 34 lying parallel to the lower longitudinal member 30 and spanning between the upright end members 31 near, but below, the upper ends thereof, and a series of intermediate longitudinal members spanning between the upright end members 31 at spaced apart elevations between, and in parallel orientation to, the upper and lower longitudinal members. In the illustrated example, the intermediate longitudinal members include first and second permanent-cladding supports 36a, 36b that are situated nearest to the lower longitudinal member 30, and over which a permanent cladding sheet 38 is permanently affixed, e.g. by welding, on the inner side of the side panel that faces into the alley. The permanent cladding sheet 38 spans a substantial entirety of the side panel in the longitudinal direction, and spans a partial (e.g. approximately half) elevation of the side panel from the lower longitudinal member 30 thereof to the uppermost of the permanent-cladding supports, i.e. the second permanent-cladding support 36b furthest from the lower longitudinal member 30.

The intermediate longitudinal members further include first and second removable-cladding supports 40a, 40b that reside above the permanent-cladding supports 36a, 36b and closer to the upper longitudinal member. In the illustrated embodiment, the upright end members 31 are not purely linear, instead having a small corner bend therein at or near the second permanent-cladding support 36b to which the upper edge of the permanent cladding sheet 38 is affixed. Accordingly, the removable-cladding supports 40a, 40b and upper longitudinal member 32 reside in non-coplanar relationship to the permanent-cladding supports 36s, 36b and lower longitudinal member 30 in the illustrated example. These corner bends in the upright end members 31 have an obtuse angular measure on the inner side of the panel that faces into the alley. A first open space 42a of the side panel's skeletal frame is delimited between the uppermost (i.e. second) permanent-cladding support 36b and the first removable-cladding support 40a. A second open space 42b of the side panel's skeletal frame is delimited between the first and second removable-cladding supports 40a, 40b, and a third open space 42c of the side panel's skeletal frame is delimited between the second removable-cladding support 40b and the upper longitudinal member 32. Each of these spaces is a full-length space spanning a substantial entirety of the side panel in the longitudinal direction, i.e. from one upright end member 31 thereof to the other.

For each side panel of the modular system, at least one selectively mountable/removable cladding member 44 is provided for optional mounting thereof over one of the open spaces 42a, 42b, 42c of the side panel's skeletal frame. In the illustrate embodiment, the three open spaces 42a, 42b, 42c are of equal size and shape to one another, and the mountable/removable cladding member 44 is of similar size and shape to enable substantially full obstruction of any of the three open spaces by said mountable/removable cladding member 44. In the illustrated embodiment, all three of the open spaces are situated above the permanently cladded lower portion of the side panel. Accordingly, when not covered by cladding members 44, these open spaces denote windows through which an animal can look over the permanently cladded lower portion of the side panel to the outside environment from within the alley as they traverse therethrough. On the other hand, mounting of the mountable/removable cladding member 44 over any such window would block the animal's sightline therethrough to the outside environment. Accordingly, each mountable/removable cladding member 44 of the illustrated embodiment is also referred to herein more briefly as a "blinder".

To enable selective mounting of any of the blinders 44 over any of the open spaces of the identical side panels, each side panel is equipped with predefined mounting points 46 thereon. Each blinder 44 is likewise equipped with predefined mounting features 48 thereon at positions alignable with said mounting points to enable selective fastening of the blinder to the side panel. In the illustrated embodiment, the mounting points are internally threaded female fastening elements defined on the skeletal framework on the side panel, for example in the form of rivet nuts fastened to the tubular frame members at the outer sides thereof facing outwardly from the alley. Tapping of threaded holes into the skeletal frame itself may instead be used as an alternative to rivet nuts. In the illustrated example, two fastening elements are provided for each open space of the skeletal framework, each such fastening element 46 being secured to one of the upright end members 31 of the frame adjacent a respective one of the open space's longitudinally opposing ends. Likewise, each blinder 44 has two fastening features thereon adjacent the longitudinally opposing ends thereof.

In the illustrated example, the fastening features 48 are simply fastening holes through which separate threaded male fasteners 50, e.g. manually operable wing-bolts, can be engaged with the fastening elements 46. In the illustrated embodiment, each blinder 44 is configured for mounting in inset fashion. The blinder has a main sheet 52 of opaque material (e.g. metal sheeting, optionally corrugated), and a pair of mounting flanges 54a, 54b affixed to longitudinally opposing ends of the main sheet 52. The mounting flanges 54a, 54b are offset from the plane of the main sheet 52 such that placement of the mounting flanges 54a, 54b over the side panel's upright end members 31 at the outer side of the panel serves to inset the main sheet 52 into the open space of the side panel's skeletal framework, instead of having the main sheet 52 sit flush over the outer side of the panel's skeletal framework. Accordingly, insertion of the offset main sheet 52 into the correspondingly sized and shaped open space of the panel's skeletal framework serves to aid in alignment of the fastening features 48 of the blinder's mounting flanges 54a, 54b over the fastening elements 48 on the panel's skeletal framework. While the illustrated embodiment employs female fastening elements on the side panel framework, male fastening elements may be used in their place. However, projecting male fastening elements may be less preferable, forming a potential injury risk to equipment installers or livestock handlers, and detracting from flat-pack functionality of the modular system components during storage and transport.

In addition to the mounting elements 46 specifically positioned in adjacent relation to the open spaces of the side panel, additional mounting elements 46a of the same type are also positioned on the skeletal framework of the side panel at the permanently cladded lower portion thereof to enable mounting of a blinder 44 to the side panel in a storage position behind the permanent cladding sheet 38 thereof. In the illustrated example, each side panel features one pair of these additional mounting elements 46a on the upright end members 31 of the skeletal frame at an elevation thereon between the first and second permanent-cladding supports 36a, 36b. Accordingly, the space between the first and second permanent-cladding supports 36a, 36 on the outer side of the permanent cladding sheet 38 denote a storage space 56 in which the blinder 44 is stored in inset fashion when its mounting flanges 54a, 54b are fastened to the skeletal frame of the side panel at the additional mounting elements 46a thereof. Preferably the storage space is of generally equal size to the open spaces 42a, 42b, 42c so that inset placement of the main sheet 52 of the blinder 44 into the storage space again aids with alignment of the blinder's fastening features 48 with the mounting elements 46a. Though not shown in the illustrated example, another pair of said additional mounting elements 46a may be provided further down the upright end members 31 of the side panel so that the space between the lower longitudinal member 30 and first permanent-cladding support 36a may denote another storage space to enable optional storage of two blinders on the side panel in non-working positions leaving the open spaces of the skeletal frame unobstructed.

In one embodiment of the modular system, only a single blinder 44 is provided per side panel. In one mode of use employing elevated cladding on both sides of the alley section, each blinder 44 is placed in a first working position over the first open space 42a of the respective side panel, whereby the blinder 44 resides immediately above the permanent cladding sheet 38 to increase the elevational span and height to which the side panel is cladded on both sides of the alley. In such mode of use, the alley resembles a conventional alley of tall or intermediate cladding height that at least somewhat obstructs the animal's vision of the outside environment on both sides of the alley to minimize distraction. This mode of use is therefore referred to as a "two-sided blinding mode". In another mode of use employing low cladding on both sides, each blinder 44 is installed in the storage space 56 on the respective side panel, leaving the permanent cladding sheet 38 as the sole piece of effective cladding on each side panel. In such mode of use, the alley resembles a conventional low-cladded alley of zero or minimum animal sightline obstruction on both sides, and enabling maximum visual and/or physical interaction between the livestock and the handler(s). This mode of use is therefore referred to as a "two-sided non-blinding mode".

Two additional modes that deviate from conventional use of equally tall cladding on both sides are also enabled by the removable/storeable blinders.

In another mode referred to as a "one-sided intermediate-cladding mode", the respective blinder 44 of one side panel is mounted in its storage position to limit the effective cladding of that panel to only the permanent cladding sheet 38, thereby minimizing the elevational span and height of the cladding on that panel. Meanwhile, the respective blinder 44 of the other side panel is mounted in a first working position over the first open space 42c of that panel's skeletal frame to increase the elevational span and height of that panel to an intermediate level in which one of its two open spaces is cladded immediately above the permanent cladding. This limits animal distraction on the intermediately cladded side of the alley section, while providing greater visibility and physical access on the minimally cladded other side to enable the handler to use pressure zone techniques to encourage the livestock through the alley. As known in the art of cattle handling, an animal can sense the handler's presence in a nearby "pressure zone", which can be exploited to encourage movement of the animal without any actual physical contact by the handler. At the same time, the minimally cladded side also provides optional physical access to the livestock, for example for medical inspection and/or treatment (shots, drenching, etc.) or for physical encouragement of livestock movement if pressure zone tactics alone prove unsuccessful. By limiting or completely removing visibility for the livestock at one side of the alley, and employing pressure zone techniques at only a single dedicated side thereof, it is believe that the effectiveness of pressure zones by a single handler can be increased, thus reducing the need for physical interaction between the handler and the livestock to keep the traffic flow moving.

In another mode referred to as a "one-sided tall-cladding mode", the two blinders 44 of the section are both installed in working positions on one of the two side panels to increase the elevational span and height of the cladding thereon by obstructing two of the open spaces 42a, 42b above the permanent cladding 38. Meanwhile, the other side panel of the section lacks installation of any blinder thereon so as to minimize the cladding to only the permanently cladded lower portion. The minimally cladded side serves the same purposes outlined in the preceding paragraph, while the tall-cladded other side is even more cladded than in the "one-sided intermediate-cladding mode" to further increase the blinding effect on that side, and thereby further minimize animal distraction to encourage onward travel through the alley. Though the forgoing example of the modular system includes only one blinder per side panel, it will be appreciated that the quantity of blinders may be increased, for example enabling further occupation of the third open space 42c on either side panel to maximize the cladding to an even greater elevational span and height.

Though the blinders in the illustrated example are full-length blinders spanning the substantial entirety of the side panels in the longitudinal direction, this need not be the case, as partial-length blinders could be used to allow partial obstruction of an open space, for example to provide limited access to the livestock for medical procedures at a particular location along the alley, while making benefit of the blinder's visual obstruction of the animals sightline elsewhere along the alley. In such cases, some or all of the mounting elements 46 on the side panel's skeletal frame may be relocated from the upright end members 31 thereof to the longitudinally oriented members 36b, 40a, 40b, 32 that denote the top and bottom boundaries of the open spaces 42a, 42b, 42c. Such relocation of some or all mounting elements 46 may also be employed even in the instance of full-length blinders, in which case at least some of the mounting flanges 54a, 54b of the blinders would reside at the longitudinal top and bottom edges of the blinder's main sheet 52, rather than at the longitudinally opposing thereof.

With the selectively mountable/removable/storeable blinders, an installer, operator or handler can strategically identify a particular side of an alley, or particular section or subsection of an alley, where reduced cladding relative to other areas of the same alley would be beneficial for the purpose of promoting livestock traffic flow through the alley. While the forgoing examples focus primarily on pressure zones and physical access as the strategic motivation to identify and select areas at which to reduce the degree of cladding, other strategic considerations may motivate the selection, for example such as the use of increased daylight admission from the external environment to naturally encourage animal travel toward the daylight-illuminated area. In one such example, reduced cladding is employed at or near the downstream end of a long alley to entice the animal toward the downstream end from darker more-cladded areas situated further upstream. Also, it will be appreciated that the process of identifying and distinguishing between strategic boundary areas at which to specifically omit optional cladding for such purposes, and other boundary areas at which more cladding should be employed, need not be limited specifically to situations where the boundaries are side panels of an alleyway delimiting a longitudinal travel path. The same techniques may be similarly applied to other livestock handling equipment that likewise employ erected panels of skeletal frame construction as boundaries around an internal space or pathway to or through which the livestock is to be confined or guided.

Having described the blinders, attention is now turned to the assembly of the side panels, bows and elongated beam of the single alley section of FIGS. 1 to 3. The beam 14A features a length of rectangular metal tubing 60, that at each end features a respective fastening flange 62 sized and shaped so that its outer perimeter fits within the intact central mounting surface 26 on the header 20 of a respective one of the two bows 10A, 10B between which the beam 14A is to be fastened. In its installed position, the beam 14A occupies a central overhead position residing near the top of the assembled alley in the central vertical reference plane thereof. During use of the alley, the beam 14A thus resides in elevated relation above the livestock travelling longitudinally through the assembled alley section. Each fastening flange 62 features a set of fastening holes therein, for example each residing adjacent a respective corner of a rectangular outer perimeter of the flange. The header 20 of each bow likewise features a matching set of fastening apertures in both faces of the bow so that a set of sufficiently long fastening bolts 64 can be fed fully through the header 20 in the longitudinal direction via the fastening holes of the beam's fastening flange 62. A matching set of tnuts are threaded onto the bolts 64 at the longitudinally opposite side of the bow, thereby fastening the beam thereto.

Figure 5:
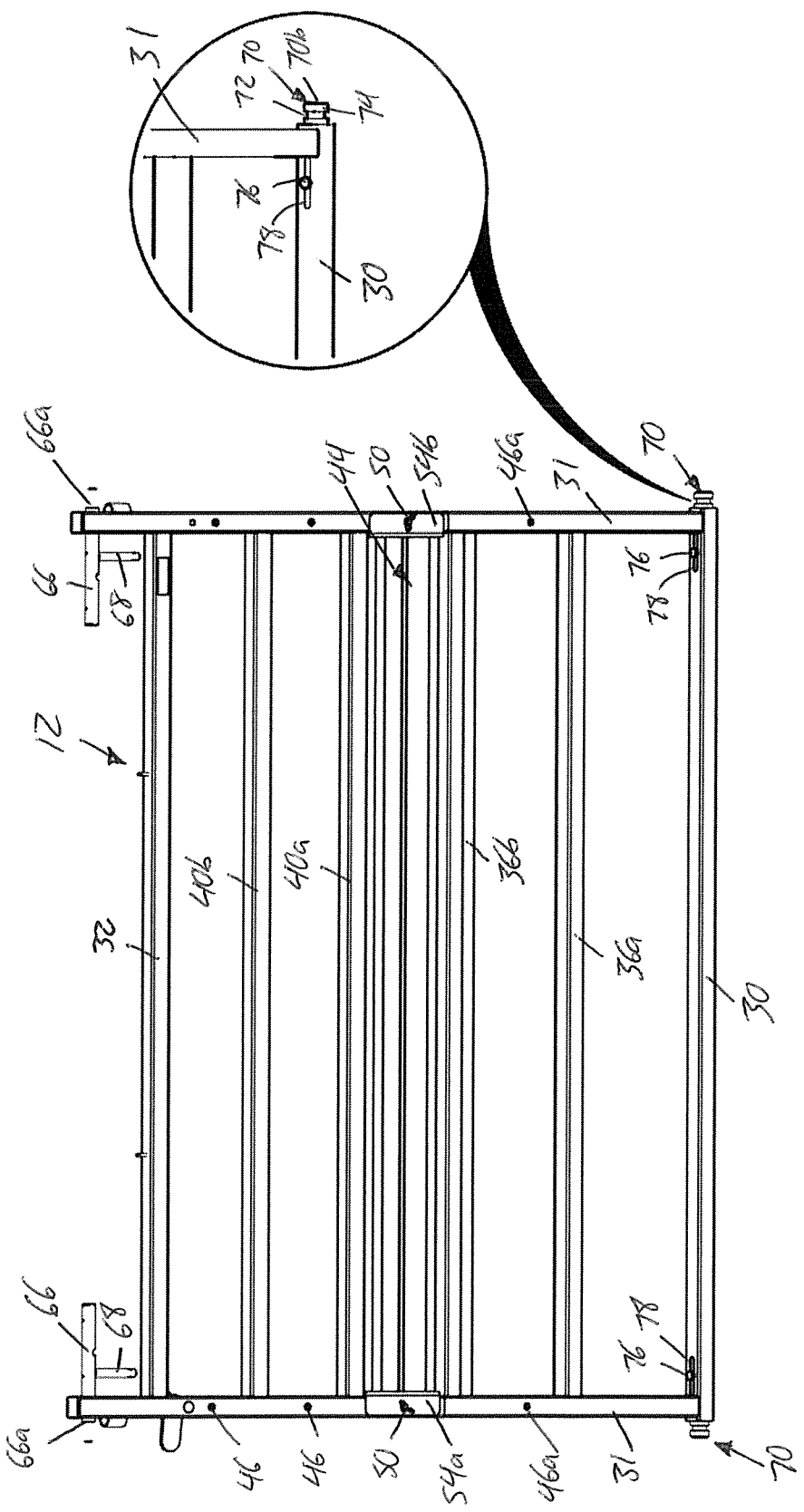
FIG. 5 is a side elevational view of one of the side panels used in the single-section and multi-section alleys of FIGS. 1 through 4, which features a circumferentially slotted and longitudinally extendable/retractable pivot pin at each end for connection of the side panel to a respective bow.
Figure 6:
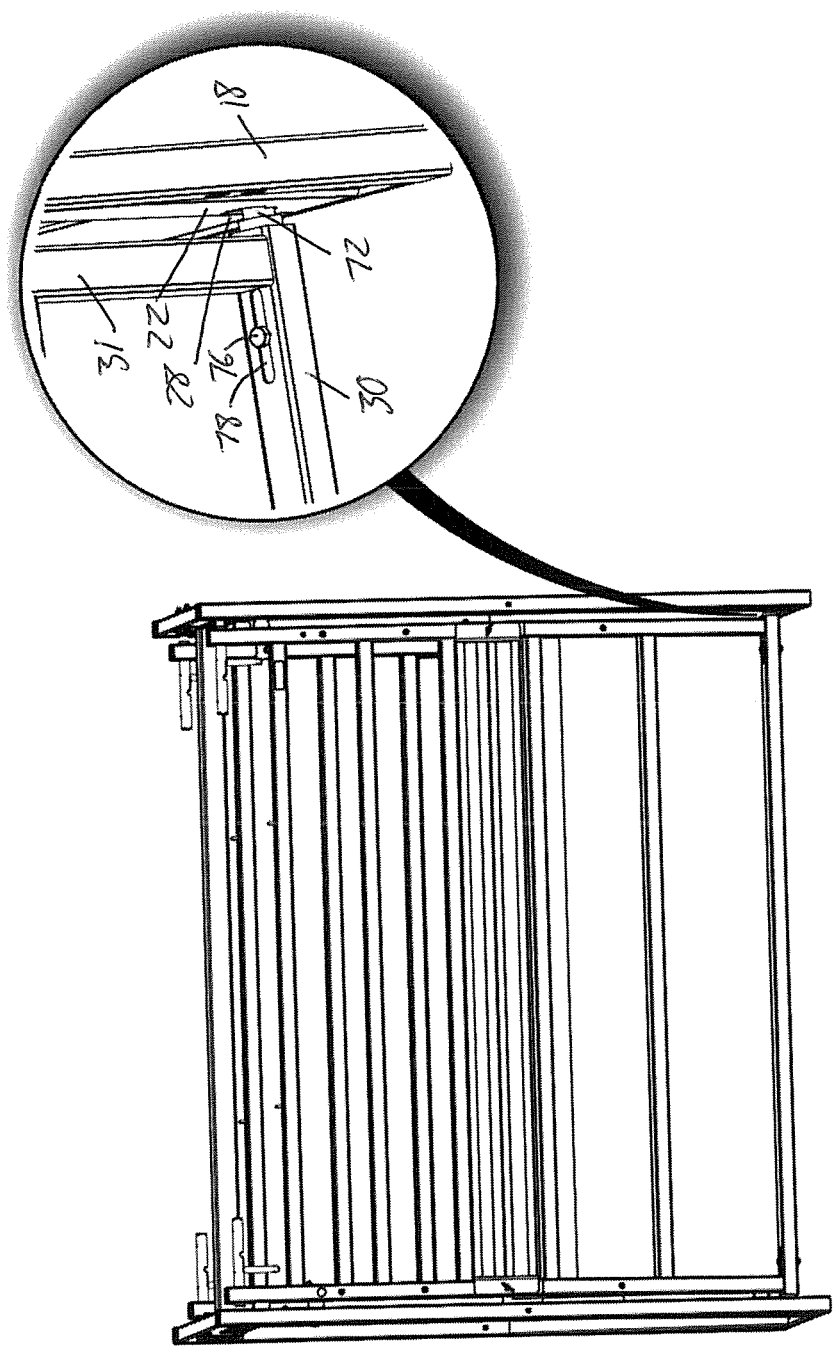
FIG. 6 is a perspective view of the single-section alley of FIG. 1, with an enlarged detail view illustrating connection of the pivot pin of FIG. 5 with a respective bow at one end of the alley section, and illustrating a stop bolt on the coupling pin that limits longitudinal sliding thereof relative to the side panel.

Turning to FIG. 5, in order to cooperate with the upper and lower panel-support openings 24a, 24b, 28 of the bows, each side panel features a number of longitudinally protruding coupling features at the longitudinally opposing ends of the panel for insertion into the panel-support openings of the bows. In the illustrated embodiment, there are two longitudinally protruding coupling features at each end of the panel, namely an extendable/retractable lock pin 66 situated at or adjacent the top end of the panel, and an extendable/retractable circumferentially grooved pivot pin 70 situated at or adjacent the bottom end of the panel.

Each upright end member 31 of each side panel carries a respective extendable/retractable lock pin 66 that penetrates horizontally and perpendicularly therethrough near the top end thereof, and is slidable back in forth of this penetrative direction to change a distance by which the lock pin 66 projects longitudinally beyond the respective longitudinal end of the side panel. On a same longitudinally inner side of the upright end member 31 as the longitudinal frame members 30, 32, 36a, 36b, 40a, 40b, the lock pin 66 features an actuation handle 68. The lock pin 66 is spring biased to extend in a longitudinally outward direction so that its distal end 66a on the opposing longitudinally outer side of the upright end member 31 is biased longitudinally away therefrom, and into a selected one of the upper panel-support openings in one of the two bows the panel is installed between. The handle 68 enables user retraction of the lock pin 66 from the selected upper panel-support opening of the bow to enable pivotal movement of the side panel about its lower end (the pivotal support of which is described further below) into a new position aligning the lock pin 66 with a different upper panel-support opening of the bow, whereupon release of the handle will automatically drive the distal end 66a of the spring-biased lock pin 66 into the newly selected panel-support opening to maintain this newly selected position of the side panel. Such pivotal adjustment of each side panel to shift its upper end toward or away from the other side panel is thus operable to adjust the effective width of the alley.

Figure 7:
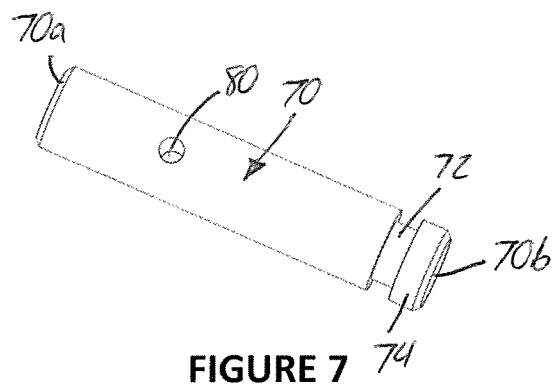
FIG. 7 is a perspective view of the circumferentially slotted coupling pin of FIGS. 5 and 6 in isolation from the side panel.
Figure 8:
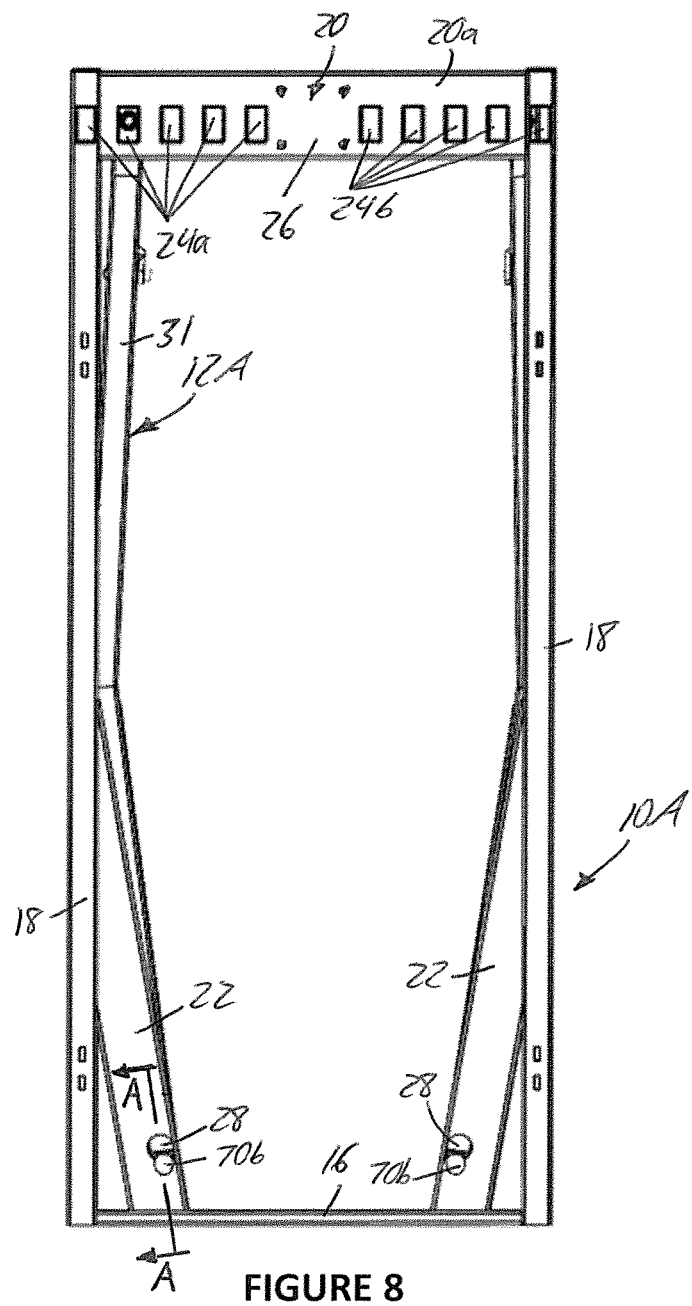
FIG. 8 is an end view of the single-section of multi-section livestock alley of FIG. 1 or 4.

Referring to FIGS. 5 and 7, each of the side panel's two pivot pins 70 features a proximal end 70a slidably received within the hollow interior of the lower longitudinal member 30 of the panel's skeletal frame, and an opposing distal end 70b residing outside the lower longitudinal member 30 at a location longitudinally beyond the respective upright end member 31 standing upward from the end thereof. The pivot pin 70 thus protrudes longitudinally outward from the respective end member 31 of the panel, just like the respective lock pin 66 installed at a higher elevation on the same upright end member 31. The pivot pin 70 features a circumferential groove 72 therein at a location near, but spaced from, the distal end 70b of the pivot pin 70. The distal end 70b of the pivot pin 70 thus features an enlarged head 74 of greater radial measure than the neighbouring circumferentially grooved area 72. Between the groove 72 and the proximal end 72a, the remainder of the pin may be of uniform diameter, for example equal to that of the enlarged head 74 at the opposing distal end 72b. The diameter of the pin's head 74 is greater than the width of the lower stem portion of each keyhole-shaped lower panel-support opening 28 in the bows, but less than the width or diameter of the enlarged upper round portion of each keyhole-shaped lower panel-support opening 28.

To couple the side panel to one of the bows, the head 74 of one of the panel's two pivot pins 70 is longitudinally inserted into the enlarged upper round portion of one of the keyhole-shaped lower panel-support openings 28 of the bow, and then the longitudinal end of the panel is dropped down to settle the circumferential groove 72 of the pivot pin 70 into the narrower lower stem portion of the keyhole-shaped lower panel-support opening 28. The enlarged head of the pin now resides inside the hollow angled side member 22 of the bow and prevents the pin from being longitudinally pulled out of this engagement with the keyhole-shaped lower panel-support opening 28. The same pivot pin insertion process is then performed with the other bow at the longitudinally opposing end of the side panel. During this insertion of the pivot pins 70 into the two bows, the side panel may reside in a ground-lain position spanning outward from between the two bows. Once both pivot pins are inserted, the lock pins 66 are held in retracted positions, and the side panel is pivoted upwardly about the shared axis of the two pivot pins 70 into a raised working position aligning the retracted lock pins 66 with a selected pair of the upper panel-support openings 24a, 24b found among the set situated on the same side of the vertical reference plane as the side panel's lower pivotal connection to the bows. Once aligned with the selected openings, the lock pins 66 are released for spring-biased engagement thereof into the selected upper panel-support openings, thus locking the side panel in place in the selected working position.

To adjust the effective alley width, the selected working position of each side panel can be changed by retracting the lock pins 66, pivoting the side panel to a different angular working position aligning the retracted lock pins 66 with a different pair of the upper panel-support openings, and releasing the lock pins 66 for spring biased engagement into this newly selected pair of openings. It will be appreciated that the lock pins 66 need not necessarily be spring biased, and may instead require manual deployment to the extended position, provided that some means for maintaining that extended position is included. In the illustrated embodiment, the upper panel-support openings 24a, 24b are of equal elevation and matching shape to one another, and are therefore vertically elongated to account for variation in the elevation of the side panel's upper lock pins 66 from one angular position of the side panel to the next during pivotal movement thereof about the panel's lower pivot axis. However, other layouts, shapes or sizes of upper panel support openings may be employed to accommodate this geometry, for example placing the upper panel support openings on an arcuate path of radial measure equal to the distance between the pivot pin axis and the lock pin axis.

Figure 9:
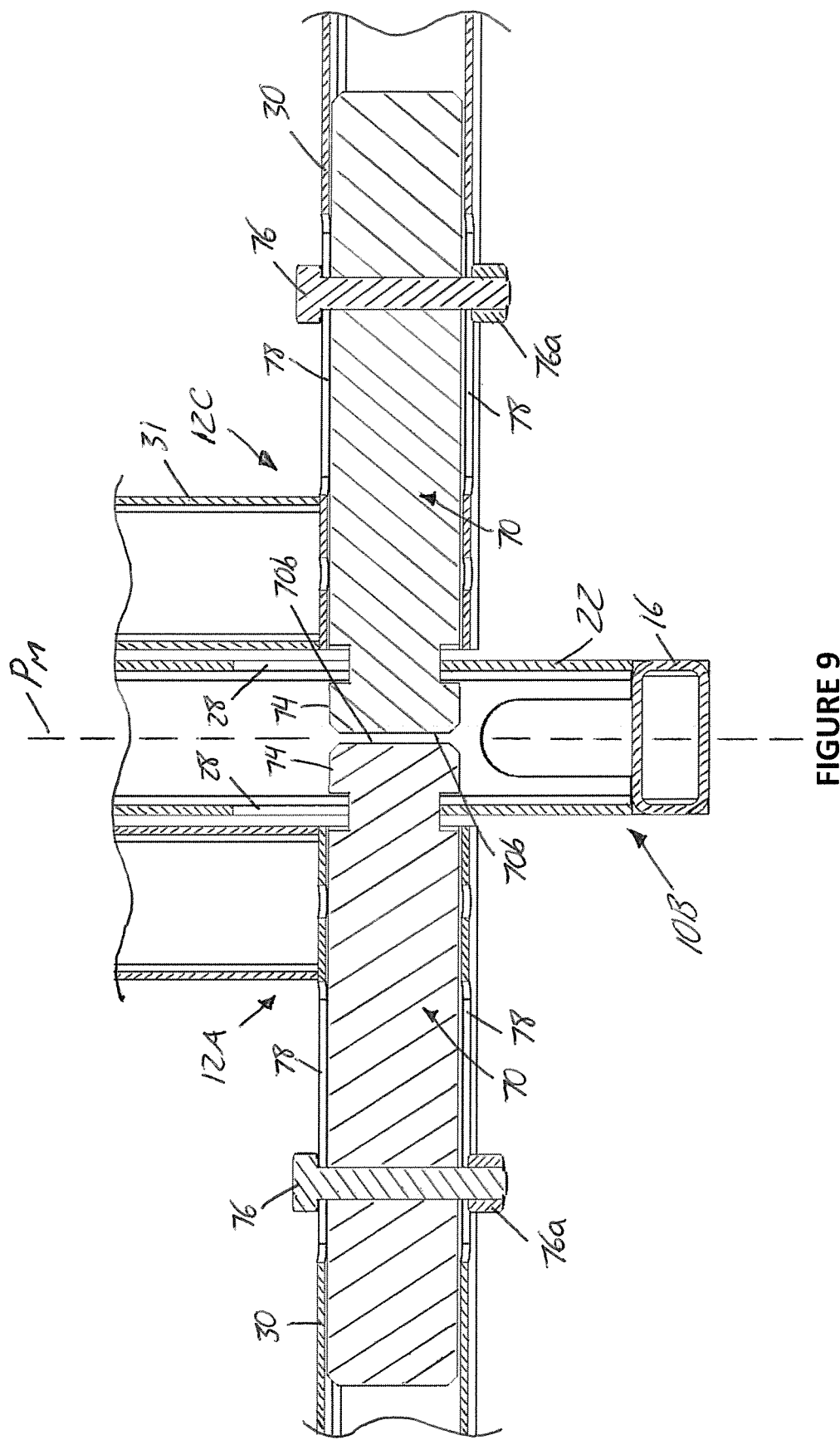
FIG. 9 is a partial cross-sectional view of the multi-section alley of FIG. 4 as would be seen at the shared bow thereof when cut along line A-A of FIG. 8, thereby illustrating engagement of the pivot pins of neighbouring side panels with the shared bow.

To accommodate for ground surface irregularities that may cause slight variation in the relative positions of the two bows at the installation site, each pivot pin 70 is freely slidable in the longitudinal direction inside the respective hollow end of the lower longitudinal member 30 of the panel's skeletal frame. The pivot pin 70 is thus extendable and retractable relative to the respective longitudinal end of the side panel to allow for variation in the longitudinal distance at which the head 74 and neighbouring groove 72 of the pivot pin 70 reside relative to the respective upright end member 31 of the frame. To limit the longitudinal travel range of the pivot pin 70, a stop member 76 attached to the pivot pin 70 projects laterally outward therefrom in at least one radial direction at a location inside the lower longitudinal member 30 of the side panel's skeletal frame. The stop member 76 extends through at least one longitudinal slot 78 in the lower longitudinal member 30 so that the longitudinal sliding movement of the pivot pin 70 is limited by contact of this stop member 76 with opposing ends of the slot 78. In the illustrated embodiment, the stop member 76 is a bolt that passes through a cross-bore 80 that penetrates diametrically through the pivot pin 70 near the proximal end 70a thereof, as shown in FIG. 7. This stop bolt 76 passes through a pair of longitudinal slots 78 in the top and bottom sides of the lower longitudinal member 30, as best shown in the cross-sectional view of FIG. 9, where the head of the stop bolt 76 resides atop the slotted topside of the lower longitudinal member 30, and a mating nut 76a is threaded onto the lower end of the stop bolt at the underside of the lower longitudinal member 30.

Having described the assembly of two bows, two side panels and one elongated beam to form a singular alley section like that of FIGS. 1 to 3, attention is now turned to FIG. 4 to describe assembly of two interconnected alley sections assembled from four side panels, two elongated beams and three bows, whereby a common bow is shared between the two sections.

The installation of two side panels of each section between two bows is the same as described above for the single-section alley. The axial measure of the pivot pin head 74, i.e. the axial distance from the pin's distal end 70b to the side of the groove 72 nearest thereto, is less than half of the internal thickness of the hollow rectangular tubing of the bows in which the keyhole-shaped lower panel-support openings 28 are formed. So referring to the shared bow 10B in FIG. 4, side panel 12B and side panel 12D have pivot pins 70 engaged in the two aligned keyhole-shaped openings 28 at one lateral side of the shared bow 10B, just as side panel 12A and side panel 12C have pivot pins engaged in the two aligned keyhole-shaped openings 28 at the other lateral side of the shared bow 10B. However, the aforementioned limitation on the head length of the pin relative to the thickness of the hollow tubing means that the pivot pin of a panel of one alley section won't interfere with the pivot pin of the neighbouring panel on the same side of the alley at the adjacent section thereof. This is best shown in the cross-sectional view of FIG. 9, where the pivot pins 70 of two neighbouring side panels 12A, 12C terminate on respective opposing sides of an internal midplane $P_M$ of the shared bow 10B. Accordingly, the heads 74 of the pivot pins 70 occupy respectively halves of the angled side member's hollow interior, and avoid any contact or interference with one another.

Figure 10:
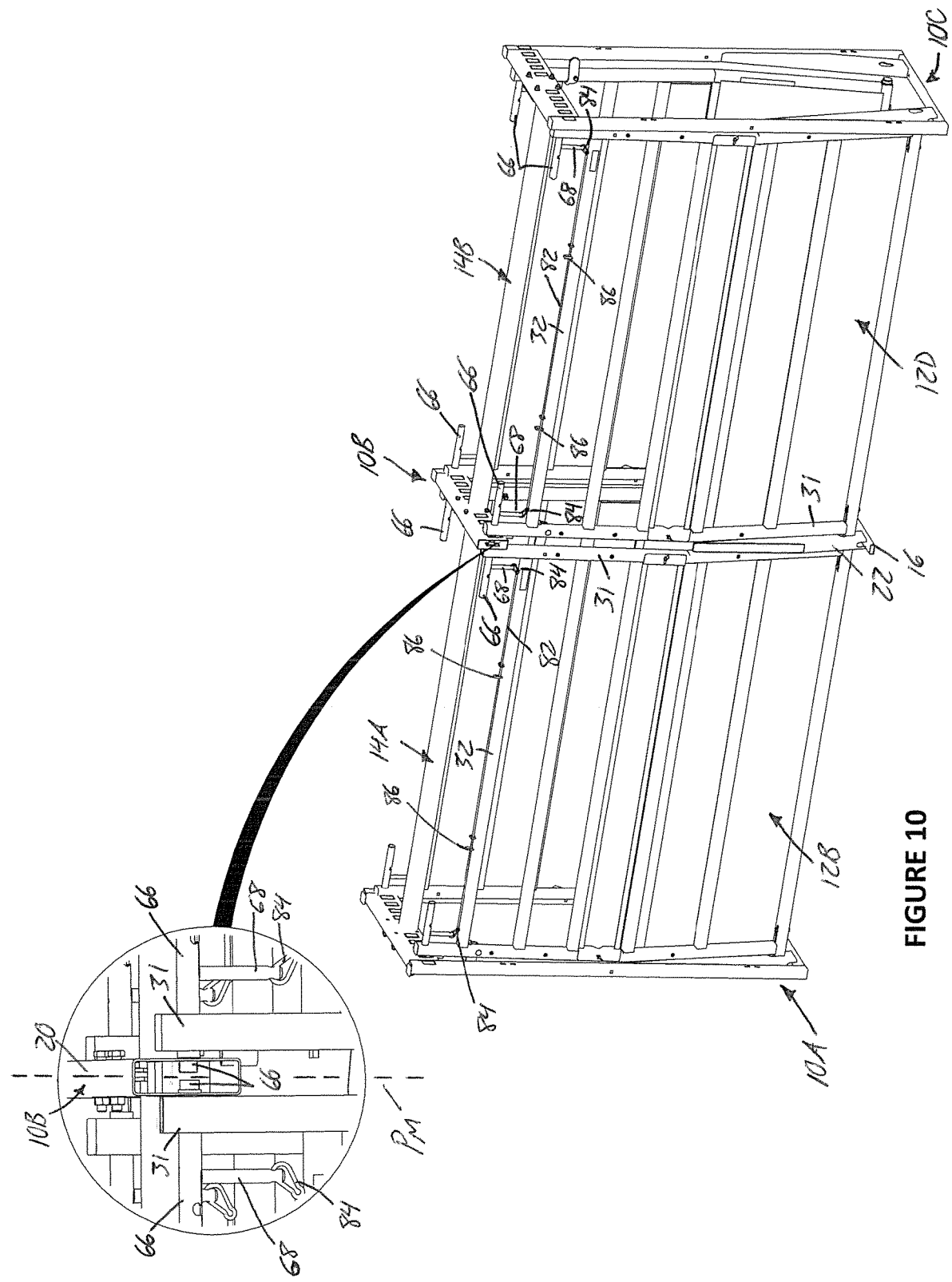
FIG. 10 is perspective view of the multi-section alley of FIG. 4, with the shared bow thereof partially cut away to reveal engagement of lock pins of neighbouring side panels of the alley with a header of said shared bow.

Likewise, the longitudinal distance by which each lock pin 66 can reach from the end of the respective side is limited to a maximum value selected such that the distal end 66a of the lock pin 66 cannot reach more than half way through the header 20 of the respective bow in the longitudinal direction. Accordingly, the lock pin 66 of a panel of one alley section won't interfere with the lock pin 66 of the neighbouring panel on the same side of the alley at the adjacent section thereof. This is best shown in the inset of FIG. 10, where the distal ends of the lock pins on the neighbouring panels 12B, 12D on one side of the alley are shown engaged in a matching pair of the upper panel-support openings of the shared bow 10B. As shown, the fully extended lock pins stop short of the internal midplane $P_M$ of the bow inside the header 20 thereof so as not to contact or interfere with one another. FIG. 10 also shows an actuation cable 82 on each side panel, whose longitudinally opposing ends are coupled to the handles 68 of the two lock pins 66 of that panel, for example using carabiner clips 84. The cable 82 is routed through a set of cable guides 86 that are affixed the topside of the upper longitudinal member 32 to define eyelets through which the cable is routed. The cable guides are provided in a quantity and layout placing a respective subset of the cable guides on each side of the cable's midpoint that resides centrally of the side panel in the longitudinal direction. Each subset thus has at least one cable guide residing at a location between the midpoint of the cable at the longitudinal center of the panel, and a respective one of the lock pins 66. Grasping of the cable 82 at central region thereof situated between the two subsets of cable guides, and pulling this central region of the cable laterally outward from the side panel, will thus pull both lock pins 66 of the side panel into their retracted positions, extracting them from the upper panel-support openings of the two bows to allow pivoting of the side panel about the lower pivot pins 70.

The installation of the elongated beams 14A, 14B is similar to that described above for a single section, except that the flanged ends 62 of the two beams 14A, 14B mounted to the shared bow 10B are fastened thereacross by a singular set of fastening bolts 64. This is shown in the inset of FIG. 4, where the bolts 64 pass through the fastening flanges of both beams 14A, 14B, and thus through the header 20 of the shared bow 10B therebetween.

The use of a double-sided header 20 that has a mounting surface, upper panel-support openings and beam fastening apertures at both longitudinally opposing faces thereof (e.g. at each two opposing outer plates of a box construction, or at two opposing outer walls of a tubular construction) allows a modular construction employing identical side panels and identical beams of equal longitudinal measure, where neighbouring ends of two beams are respectively fastened to opposing sides of a shared bow, optionally using a full set of fastening apertures and shared set of bolts; and lock pins of pivotally adjustable side panels respectively engage the openings at the two opposing faces of the bow without interfering with one another. The resulting multi-section alley thus uses a shared bow between adjacent sections to avoid foot traps, yet has notable structural integrity via connection of both side panels and elongated overhead beams between the bows, and features a novel connection solution for pivotally adjustable side panels that enables non-interfering functionality of neighbouring panels sharing a common bow, as the pivot pin and lock pin of each panel engages only the respective opening at its side of the shared bow, leaving the matching opening at longitudinally opposite side of the bow available for the neighbouring panel of the adjacent section.

While the illustrated embodiment employs four sided rectangular tubing and/or a four sided box structure at the bow components that are penetrated on both front and rear sides by the various purposeful holes described herein (i.e. the upper and lower panel-support openings, and fastening apertures), it will be appreciated instead of using opposing walls of rectangular tubing or opposing sides of a closed-box structure, all or some of these purposeful holes may instead be formed in individual metal plates at the front and rear faces of the bow in an alternative construction thereof. Likewise, while the illustrated embodiment employs keyhole shaped lower panel-support openings of closed-border geometry bounded on all sides around a full perimeter thereof, it will be appreciated that a fully-bounded opening need not be employed to receive and retain the grooved pivot pin, as, for example, a cradle like U-shape opening lacking a bounded upper portion could be formed in a metal face place of the aforementioned alternative bow construction for the purpose of rotatably cradling the grooved area of the pivot pin, just like the lower-stem of the of keyhole-shaped example of the illustrated embodiment, but without the larger rounded upper portion thereof. That being said, the use of tubular constructions may be preferable, particularly in relation to the lower panel-support openings, where exposed edges are best avoided to minimize injury risk to the animals passing through the alley.

It will be appreciated that many of the novel features described herein, such as the use of the circumferentially grooved pivot pin to cooperatively mate with a panel-support opening of non-uniform width for both pivotal support and retention of the alley side panel, and the extendibility/retractability of the pivot pin to accommodate for ground variations and/or to ease the assembly process, may be employed regardless of whether such features are particularly used in the context of a modular system designed to employ a shared-bow between adjacent sections of multi-section alleys.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A modular livestock alley system comprising:
a plurality of bows each comprising a lower base, an upper header, and a pair of uprights spanning between the lower base and upper header at opposite lateral sides of the bow, whereby the lower base, upper header and pair of uprights cooperatively delimit an opening through which an animal can traverse;
a plurality of side panels each comprising two longitudinally opposing ends at which the side panel is configured for connection to any one of said bows at either one of a front or a rear face thereof; and
a plurality of elongated upper beams of equal longitudinal measure to one another and each comprising two ends at which the elongated upper beam is configured for connection to the front or rear face of any one of said bows at or near an upper end thereof;
whereby a pair of said panels and one of said elongated upper beams are connectable between a pair of said bows during construction of an alley section that is terminated at opposing ends thereof by said pair of bows, through which an animal can enter and exit said alley section during travel therethrough between the pair of side panels; and
wherein:
each bow, at both front and rear faces thereof that face in longitudinally opposite directions from the opening of the bow at the front and rear faces thereof, is configured for optional connection of any respective pair of said side panels to enable sharing of a singular bow between two adjacent alley sections; and
the upper header of each bow is a double-sided header comprising a respective mounting surface at each face of the bow to receive an end of a respective one of the elongated upper beams whose other end is receivable by the upper header of another bow.

2. The system of claim 1 wherein each bow comprises front and rear sets of panel-support openings respectively disposed at the front and rear faces of the bow, each set of said panel-support openings being configured to mate with protruding coupling features of a respective pair of side panels when installing said bow as a shared bow between two alley sections, and each set of said panel-support openings comprising upper panel-support openings situated proximate a top end of the bow and lower panel-support openings situated proximate a bottom end of the bow.

3. The system of claim 2 wherein each of the protruding coupling features of the side panels is configured not to occupy more than half of an internal thickness of hollow portions of the bows in which the panel-support openings are formed.

4. The system of claim 1 wherein each side panel comprises a circumferentially grooved pivot pin projecting longitudinally therefrom at each of the longitudinally opposing ends thereof.

5. The system of claim 4 wherein each bow comprises, at each of the front and rear faces thereof, an opening of non-uniform width configured to receive the circumferentially grooved pivot pins of the respective pair of side panels in positions engaging the circumferential grooves thereof.

6. The system of claim 1 wherein each side panel comprises at least one extendable and retractable pivot pin at a respective one of the longitudinally opposing ends of said side panel at or adjacent a lower end of said panel, said extendable and retractable pivot pin being longitudinally extendable/retractable to adjust a distance by which said extendable and retractable pivot pin projects longitudinally from said side panel.

7. The system of claim 1 comprising a set of fasteners of axial length exceeding a thickness of the upper header, and aligned fastening apertures in the front and rear faces of each bow to enable passage of said fasteners fully through the upper header for shared fastening of two of said elongated upper beams at the front and rear faces of the bow by the same set of fasteners.

8. The system of claim 6 wherein each extendable and retractable pivot pin is slidably received in a hollow end of a frame member of the side panel, and each pivot pin comprises a stop member protruding therefrom and engaged in a longitudinal slot of the frame member of the side panel to limit longitudinal extension and retraction of the pivot pin relative to the side panel.

9. The system of claim 1 wherein each side panel comprises a respective lock pin that is installed at each of said longitudinally spaced apart ends of said side panel and is movable between a deployed position reaching longitudinally from the respective end of the side panel for engagement with a respective one of said pair of bows, and a retracted position of lesser longitudinal reach from the respective end of the side panel for disengagement from said respective one of said pair of bows, and a shared actuation device operable to move both of said lock pins into the retracted position.

10. The system of claim 9 wherein the shared actuation device comprises a cable connected to both of said lock pins.

11. The system of claim 10 wherein said cable is routed through a set of cable guides mounted on the side panel at longitudinally spaced positions therealong.

12. The system of claim 11 wherein said set of cable guides comprises two subsets of cable guides, each subset comprising at least one cable guide disposed between a longitudinal midpoint of the side panel and a respective one of the lock pins, whereby gripping and pulling of the cable at a central region thereof between the two subsets of cable guides is operable to pull both of the locking pins into the retracted position.

\* \* \* \* \*